United States Patent [19]

Bircher et al.

[11] Patent Number: 5,124,051
[45] Date of Patent: Jun. 23, 1992

[54] PROCESS FOR TREATMENT OF CONTAMINATED WASTE WATER OR GROUNDWATER

[75] Inventors: Keith G. Bircher, Richmond Hill; Cuong V. Luong, Mississauga, both of Canada

[73] Assignee: Solarchem Enterprises Inc., Ontario, Canada

[21] Appl. No.: 619,573

[22] Filed: Nov. 29, 1990

[51] Int. Cl.⁵ ............................................. C02F 1/78
[52] U.S. Cl. .................................. 210/748; 210/759; 210/760; 210/903; 210/909; 149/124
[58] Field of Search ............... 149/105, 106, 107, 124; 210/903, 909, 758, 759, 760, 724, 743, 748

[56] References Cited

U.S. PATENT DOCUMENTS

| | | |
|---|---|---|
| 3,856,673 | 12/1974 | De La Mater et al. .............. 210/758 |
| 4,038,116 | 7/1977 | Andrews et al. ................... 149/124 |
| 4,073,726 | 2/1978 | Okamoto et al. .................... 210/909 |
| 4,793,931 | 12/1988 | Stevens et al. ...................... 210/748 |
| 4,861,497 | 8/1989 | Welch et al. ......................... 210/763 |
| 4,956,098 | 9/1990 | Stevens et al. ...................... 210/760 |

OTHER PUBLICATIONS

Hoigne et al, "The Role of Hydroxyl Radical Reactions In Ozonation Processes in Aqueous Solution," Solarchem, vol. 10, pp. 377-386.

Layne et al, "Ultraviolet-Ozone Treatment of Pink Wastewater, a Pilot Scale Study," Mason & Hanger-Silas Mason Co., Inc., Iowa Army Ammunition Plant, Middletown, Iowa AD-B 068215, 1982.

Ho, "Photooxidation of 2,4-Dinitrotoluene in Aqueous Solution in the Presence of Hydrogen Peroxide," *Environmental Science Technology*, vol. 20, No. 3, 1986, pp. 260-266.

*Primary Examiner*—Peter Hruskoci
*Assistant Examiner*—Neil M. McCarthy
*Attorney, Agent, or Firm*—Lowe, Price, LeBlanc & Becker

[57] ABSTRACT

A process is provided for treating aqueous waste or groundwater contaminated with nitro-containing organic chemicals to degrade the compound sufficiently to permit disposal of the waste or groundwater.

14 Claims, 4 Drawing Sheets

PROCESS FOR TREATMENT OF CONTAMINATED WASTE WATER OR GROUNDWATER

FIELD OF THE INVENTION

This invention relates to processes for treatment of waste water or groundwater containing nitro-containing organic chemical compounds such as aromatic explosives.

BACKGROUND OF THE INVENTION

Contamination of waste water or groundwater with nitro-containing organic chemical compounds such as aromatic explosives presents a considerable disposal problem. The manufacture of 2,4,6-trinitrotoluene (TNT), for example, can result in the production of extremely toxic waste water containing 50–125 mg/L TNT.

Traditional methods of treatment of this waste water, frequently called pinkwater, have employed activated carbon which has some inherent disadvantages. First, the loading of explosives on carbon can present a safety problem, and second, the loaded carbon cannot be safely regenerated so there is a secondary disposal problem.

A newer method of treating contaminated waste water and groundwater is to utilize advanced oxidation. This involves oxidizing the wastes by employing highly reactive oxidative species such as hydroxyl radicals. There are many methods of generating hydroxyl radicals including photolysis of hydrogen peroxide, photolysis of ozone, ozone with hydrogen peroxide, and ozone at alkaline pH.

Andrews et al. (U.S. Pat. No. 4,038,116) and others have employed ultraviolet (UV) light along with hydrogen peroxide or acetone to treat TNT waste.

While this method is capable of reducing TNT levels to <1 ppm, it does not produce waste water which can pass the type of fish toxicity tests imposed by environmental regulatory requirements.

Layne et al. have described use of UV/ozone to treat TNT and other aromatic explosives ("Ultraviolet-Ozone Treatment of Pink Waste Water, A Pilot Scale Study", Mason & Hanger-Silas Mason Co. Inc., Iowa Army Ammunition Plant, Middleton, Iowa, AD-B 068215, 1982).

Ozone treatment has generally been carried out around pH 7.0 to 9.0, and is very costly where treatment has to provide an effluent capable of passing a fish toxicity test as well as having a discharge level of <1 ppm.

SUMMARY OF THE INVENTION

According to one aspect of the present invention, a process is provided for treating aqueous waste or groundwater contaminated with a nitro-containing organic chemical compound having a $pK_a$ of 15 or less to degrade the compound sufficiently to permit disposal of the waste or groundwater, the process comprising the steps of:
(a) adjusting the pH of the aqueous waste or groundwater to a pH in the range of ± about 3 pH units from the $pK_a$ of the compound and maintaining the waste or groundwater at that pH for a time sufficient to permit an effective amount of hydrolysis of the compound; and
(b) treating the waste or groundwater with at least one hydroxyl radical generating agent in an effective amount based on the initial concentration of the compound in the waste or groundwater.

BRIEF DESCRIPTION OF THE DRAWINGS

The invention, as exemplified by preferred embodiments, is described with reference to the drawings in which.

DETAILED DESCRIPTION OF THE INVENTION

When aqueous waste or groundwater containing nitro-containing organic compounds such as TNT is treated with ozone, hydroxyl radicals are formed which degrade the organic compound, in accordance with the following equations:

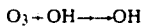

$$O_3 + OH^- \longrightarrow \cdot OH$$

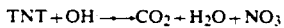

$$TNT + \cdot OH \longrightarrow CO_2 + H_2O + NO_3^-$$

Figure 1:
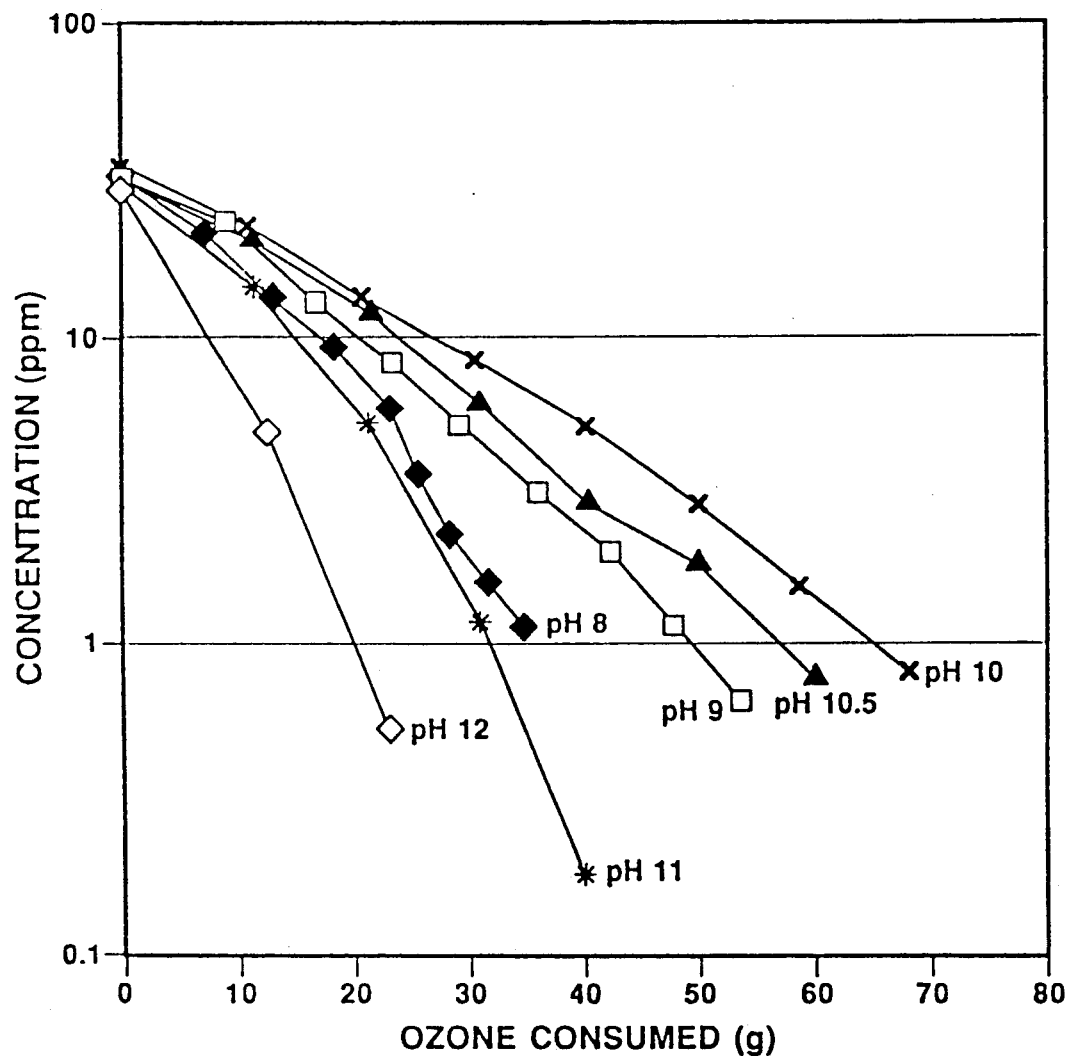
FIG. 1 shows TNT destruction by ozone at various pH values.

Although increasing pH is known to give an increased rate of generation of hydroxyl radicals by ozone, the efficiency of ozone utilization decreases dramatically as pH is increased from 8.0 to 10.0, and the efficiency of degradation of TNT decreases, as seen in FIG. 1.

The present inventors have found, however, that as pH was increased above 10.0, an unexpected reversal of the pH effect on ozone utilization was seen. As the pH of TNT-containing waste was increased above 10.0, an unexpected increase in the efficiency of ozone utilization and of TNT degradation was observed, as seen in FIG. 1.

Figure 2:
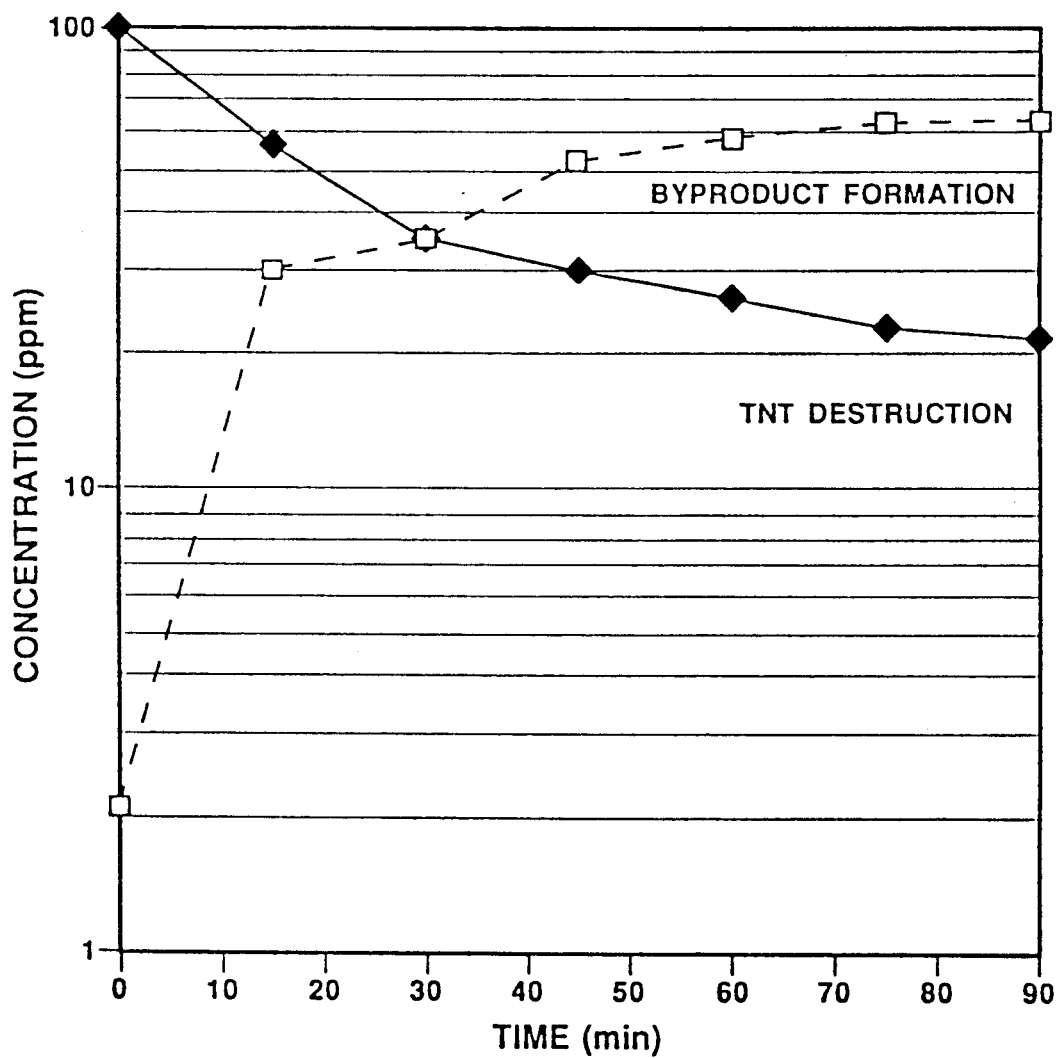
FIG. 2 shows alkaline hydrolysis of TNT.

When TNT-containing aqueous waste was stirred at pH 12.0 in the absence of ozone, TNT concentration fell over time from an initial concentration of around 100 ppm levelling off around 20 ppm, as seen in FIG. 2. TNT was not similarly degraded at pH values of 8.0 or 10.0.

As TNT levels fell on treatment at pH 12.0, increasing formation of a by-product was detected by HPLC as seen in FIG. 2.

Figure 3:
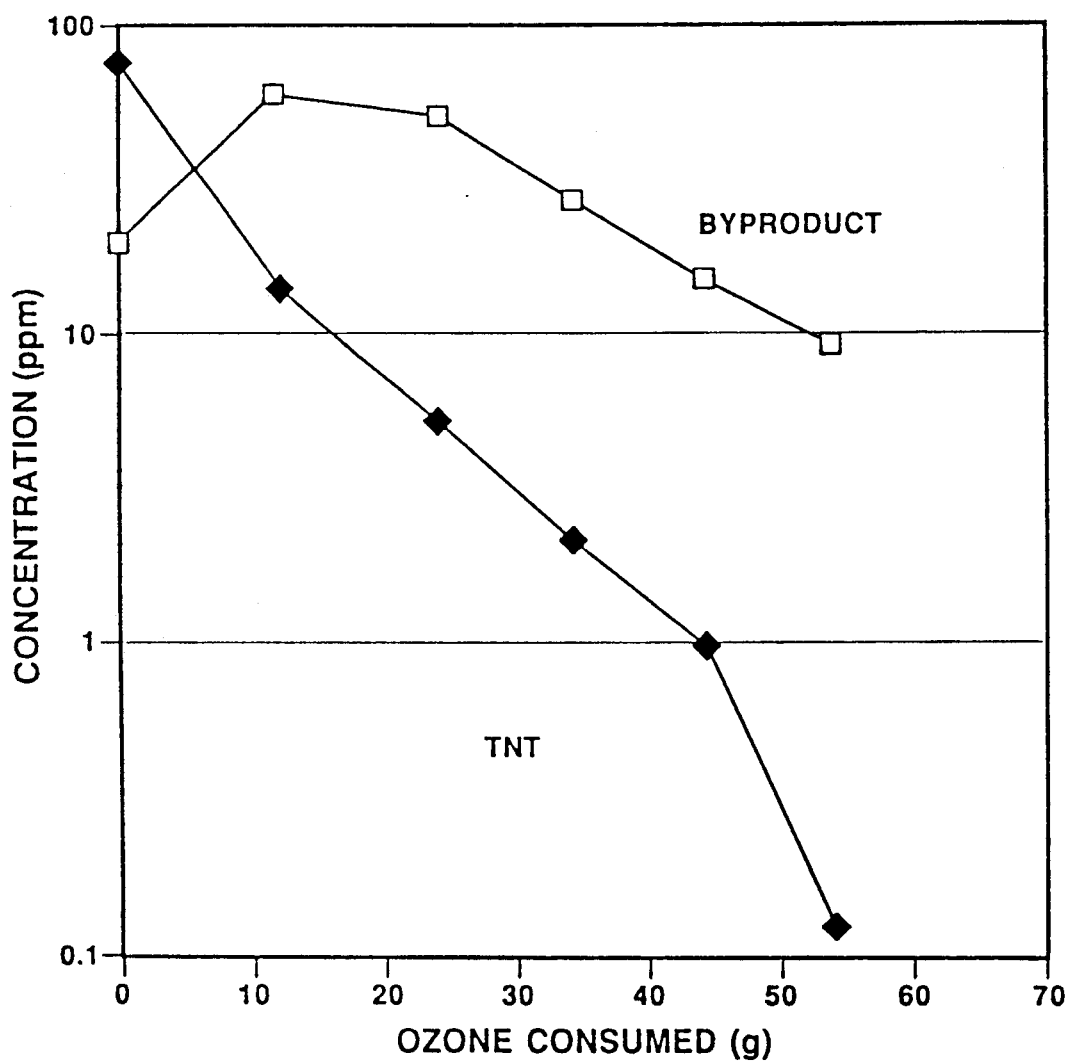
FIG. 3 shows effect of ozone on TNT and its alkaline hydrolysis by-product.

This by-product of alkaline hydrolysis of TNT is destroyed by treatment with ozone as shown in FIG. 3.

A possible explanation of the unexpected improvement in efficiency of TNT degradation by ozone as pH is increased beyond 10.0 is that the by-product of alkaline hydrolysis of TNT reacts more rapidly with ozone and/or the hydroxyl radical than does TNT itself.

In a preferred embodiment of the invention, waste water or groundwater containing TNT is adjusted to a pH in the range of about 10.7 to about 14, by addition of sodium hydroxide or other suitable base and is maintained at this pH with mixing for about 15 to 30 minutes during which time TNT is degraded to an unidentified hydrolysis product or products. The waste is then treated with ozone which degrades both remaining TNT and the hydrolysis product or products.

Ozone treatment is continued until discharge criteria are satisfied i.e. until the waste passes a fish toxicity test and its residual TNT concentration is at a desired level.

In an alternate embodiment of the present method, the pH of the waste water is adjusted as described above, followed by treatment with the hydroxyl radical generating agent, without a waiting period between these steps. This embodiment is demonstrated below in Examples 5 and 6.

In an especially preferred embodiment of the invention, the waste water is adjusted to a pH in the range of about 11.0 to about 12.0 and maintained at that pH as described above prior to ozone treatment.

Treatment of TNT at high pH, for example at pH 12.0, provides a saving of about two thirds of the ozone which would be required to reach a TNT discharge level of around 1 ppm if operations were carried out around pH 9.0 to 10.0, as seen from FIG. 1.

In addition, ozone treatment produces waste capable of satisfying fish toxicity requirements which may not be achieved by other methods which give similar TNT reduction, as seen in Example 4.

In some instances, TNT discharge requirements may be much less than 1 ppm. In such situations, it is uneconomic to use only pH and ozone treatment to reach the desired discharge level.

In a further embodiment of the invention, the waste is adjusted to a pH in the range of about 11.0 to about 12.0 and maintained at that pH as described. The waste is then treated with ozone until fish toxicity requirements are met, after which it is treated with hydrogen peroxide and UV light or UV light alone until the desired TNT discharge level is reached.

For treatment of wastes and groundwater containing nitro-containing organic chemical compounds which have a $pK_a$ of 15 or less, the waste is adjusted to a pH in the range of $\pm$ about 3 pH units from the $pK_a$ of the compound, to a maximum of about pH 14, to allow hydrolysis, followed by treatment with ozone or other hydroxyl radical generating agents as described for TNT.

EXAMPLE 1

Figure 4:
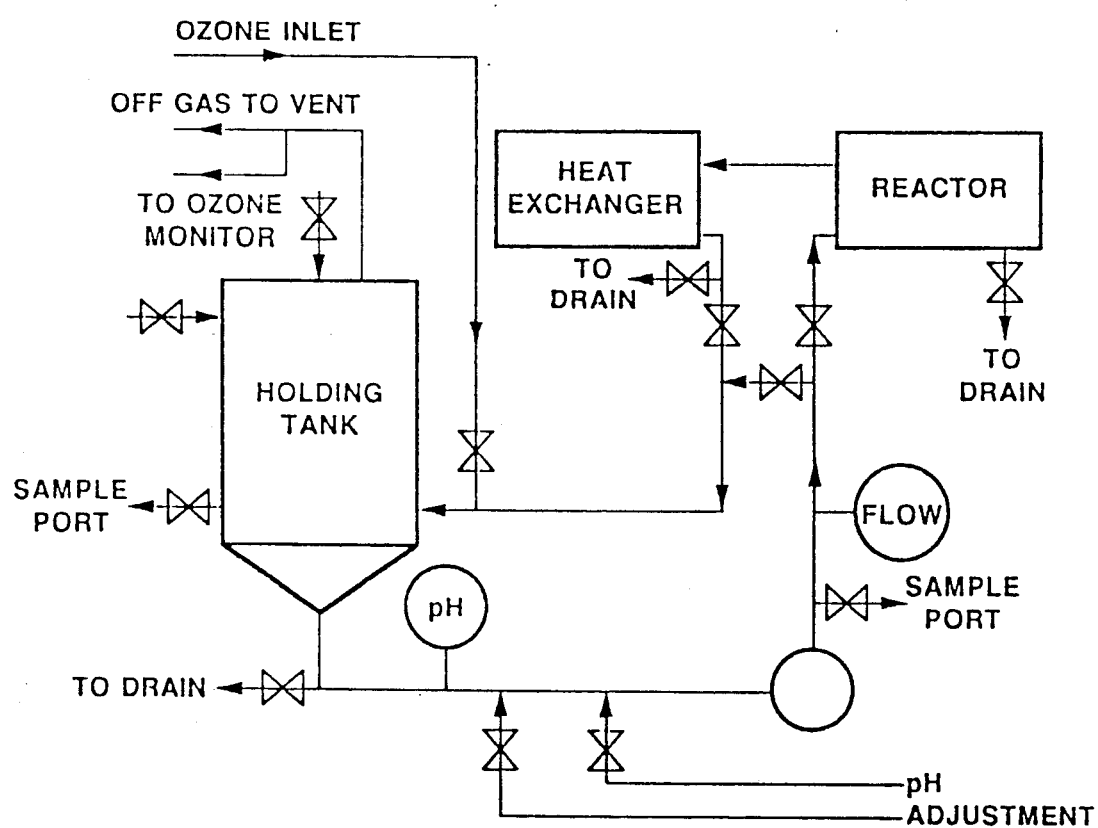
FIG. 4 shows batch recirculation equipment.

TNT-containing waste water having a TNT concentration of around 30 ppm was obtained from an explosives manufacturer. TNT was added when required to give higher TNT concentrations. Waste water was treated in a batch recirculation set up as shown in FIG. 4. Wetted parts in the system were: 316 stainless steel, quartz, viton and polyethylene. 180L of waste water was added to the 200L holding tank. The pH of the waste water was adjusted and controlled by means of a pH controller which could meter in base or acid as required, mixing being effected by pumping the waste from the holding tank through a 20L reactor at 75 Lpm.

Waste water pH was adjusted to 8.0 by addition of sodium hydroxide and mixed for 15 minutes before addition of ozone.

Ozone was generated in air at concentrations between 0.75% and 2.2% by weight (in most cases, 1.3% by weight) using a PCI Model G14 ozone generator and ozone flowrate of 47 Lpm. Ozone was added into the holding tank through a venturi mixer. Ozone concentrations in influent air and offgas were measured continually with PCI Model HC ozone monitor.

Samples were withdrawn from the bottom of the holding tank or after the pump at 15 minute intervals for analysis of TNT concentration by high pressure liquid chromatography (HLPC) using 60% v/v acetonitrile in water as solvent and with detection by ultraviolet absorption at 272 nm.

Ozone flow was commenced and continued until the TNT concentration of the waste water was below 1 ppm.

Ozone consumption at pH 8.0 plotted against TNT concentration in ppm is shown in FIG. 1.

The experiment was repeated at pH 9.0, 10.0, 10.5, 11.0 and 12.0, the results being shown in FIG. 1.

It can be seen that as pH is increased from 8.0 to 10.0, ozone consumption increases greatly but as pH is raised further, there is an unexpected decrease in ozone consumption giving a much more efficient process in terms of ozone consumption at pH values of about 11 and higher.

EXAMPLE 2

The experimental set up of Example 1 was used to examine TNT hydrolysis at pH 12.0. No ozone was used in this experiment. Waste water Was adjusted to pH 12.0 and maintained with mixing at that pH. Samples at various time intervals were analysed by HPLC as in Example 1, for TNT concentration and also for levels of an unidentified by-product which eluted before TNT from the HPLC column. The by-product concentration is approximate, being calculated by assuming the same detector response as for TNT.

The decrease in TNT level and increase in by-product level with time of treatment at pH 12.0 is shown in FIG. 2.

EXAMPLE 3

TNT-containing waste water, after treatment at pH 12.0 as in Example 2, was treated with ozone as in Example 1. Ozone treatment reduced the concentration of both TNT and hydrolysis product as seen in FIG. 3.

EXAMPLE 4

TNT-containing waste water (180L) was treated in the batch recirculation set up of Example 1 with hydrogen peroxide ($H_2O_2$) and ultraviolet (UV) light at pH 8.0.

$H_2O_2$ was obtained as a 35% w/w solution and was added to the holding tank to give a concentration of 400 ppm, with mixing by pumping through the 20L reactor at 75 Lpm. The reactor was fitted with a Solarchem 1 kw UV lamp which was switched on at time zero.

Treatment was continued until waste water TNT concentration had dropped to 0.4 ppm. TNT concentration over time was as shown in Table 1.

TABLE 1

| Time, min | TNT, ppm |
|---|---|
| 0 | 92.5 |
| 10 | 59.1 |
| 20 | 40.9 |
| 30 | 27.5 |
| 40 | 17.8 |
| 50 | 10.4 |
| 60 | 5.8 |
| 70 | 2.8 |
| 80 | 1.7 |
| 90 | 0.8 |
| 100 | 0.6 |
| 110 | 0.4 |

A sample of the $H_2O_2$/UV-treated waste water was treated with sodium sulphite to destroy residual $H_2O_2$ and sent to a commercial analytical laboratory for testing by the 96-hour $LC_{50}$ toxicity test on rainbow trout. $LC_{50}$ of the $H_2O_2$/UV-treated waste water was 1.7% i.e. 50% of the fish died on exposure to a 1.7% solution of the treated waste. Thus although TNT had been reduced to an acceptable discharge level (<1 ppm), the $H_2O_2$/UV treatment was not sufficient to produce waste capable of passing the fish toxicity test. $LC_{50}$ values less than 100% are unacceptable. $LC_{50}$ of 100% means that undiluted (100%) waste kills 50% of fish.

EXAMPLE 5

TNT-containing waste water was adjusted to pH 12.0 and treated with ozone as described in Example 1, until TNT concentration was <1 ppm. TNT concentration and $O_3$ consumption with time was as shown in Table 2.

TABLE 2

| Time, min | TNT, ppm | $O_3$ consumed, g |
|---|---|---|
| 0 | 127.8 | 0 |
| 15 | 14.6 | 12.5 |
| 30 | 4.8 | 24.9 |
| 45 | 1.7 | 35.8 |
| 60 | 0.74 | 47.3 |
| 75 | 0.32 | 58.2 |
| 90 | 0.1 | 68.9 |
| 105 | 0.04 | 78.7 |

A sample of the treated waste was tested by the 96-hour $LC_{50}$ toxicity test as described in Example 4. The $LC_{50}$ of the treated waste was NL, i.e. non-lethal or not toxic at all.

EXAMPLE 6

TNT containing waste water was adjusted to pH 10.0 and treated with ozone as in Example 1 for 60 minutes, until the TNT level was 5.1 ppm. Ozone supply was stopped an the waste was then treated with $H_2O_2$ (400 ppm) and UV light, as in Example 4, until TNT level was 0.97 ppm. TNT level and $O_3$ consumption are shown in Table 3.

TABLE 3

| Time, min | $O_3$ consumed, g | TNT, ppm |
|---|---|---|
| 0 | 0 | 32.7 |
| 15 | 10.7 | 21.0 |
| 30 | 20.7 | 13.6 |
| 45 | 30.4 | 8.7 |
| 60 | 40.2 | 5.1 |
| 65 | — | 2.7 |
| 70 | — | 1.6 |
| 75 | — | 0.97 |

A sample of the treated waste was tested by the 96-hour $LC_{50}$ toxicity test and $LC_{50}$ was found to be 49%.

Comparing the treated waste of this example (final TNT level: 0.97 ppm; $LC_{50}$ 49%) with the waste treated as in Example 4 (final TNT level : 0.4 ppm; $LC_{50}$ 1.7%), Example 4 gave a lower TNT level but a more toxic product, indicating that ozone treatment as in Example 5 reduces waste toxicity by degrading other toxic components as well as TNT.

Treatment of TNT-containing waste water at high pH followed by ozone treatment, in accordance with the invention, is much more efficient in terms of ozone consumption than previously available methods and produces a treated product which meets fish toxicity requirements as well as TNT level discharge requirements.

Although the invention has been described in relation to preferred embodiments, the present invention is not limited to features of this embodiment, but includes all variations and modifications within the scope of the claims.

We claim:

1. A process for treating aqueous waste or groundwater contaminated with a nitro-containing organic chemical compound having a $pK_a$ of 15 or less said process comprising the steps of:
   (a) adjusting the pH of said aqueous waste or groundwater to a pH greater than 10 to permit an effective amount of hydrolysis of said compound; and
   (b) treating said waste or groundwater with at least one hydroxyl radical generating agent comprising ozone in an effective amount based on the initial concentration of said compound in said waste or groundwater, the amount of said hydrolysis of said compound and the amount of said hydroxyl radical generating agent being sufficient to reduce the concentration of the compound in said waste or groundwater to a desired discharge level.

2. A process according to claim 1 wherein said nitro-containing compound is a nitro-toluene.

3. A process according to claim 2 wherein said nitro-toluene is a dinitrotoluene.

4. A process according to claim 2 wherein said nitro-toluene is a trinitrotoluene.

5. A process according to claim 4 wherein said nitro-toluene is 2,4,6-trinitrotoluene and said waste or groundwater is adjusted to a pH in the range of about 10.7 to about 14.0.

6. A process according to claim 5 wherein said waste or groundwater is adjusted to a pH in the range of about 11.0 to about 12.0.

7. A process according to claim 1 wherein step (b) comprises treating said waste or groundwater with ozone at an ozone: 2,4,6-trinitrotoluene ratio of about 4 to 5:1 w/w.

8. A process according to claim 1 wherein step (b) comprises treating said waste or groundwater with ozone until said waste or groundwater meets a 96-hour $LC_{50}$ toxicity test and further comprising the step of treating said waste or groundwater with hydrogen peroxide and ultraviolet light until 2,4,6-trinitrotoluene therein is at the desired discharge level.

9. A process according to claim 1 wherein step (b) comprises treating said waste or groundwater with ozone until said waste or groundwater meets a 96-hour $LC_{50}$ toxicity test and further comprising the step of treating said waste or groundwater with ultraviolet light until 2,4,6-trinitrotoluene therein is at the desired discharge level.

10. A process according to claim 1 wherein the pH of said waste is adjusted by addition of a suitable base.

11. A process according to claim 1 wherein the pH of said waste is adjusted by addition of a sodium hydroxide.

12. A process according to claim 1 wherein the concentration of the compound in said waste or groundwater is not greater than about 1 ppm.

13. A process according to claim 1 wherein the waste or groundwater is adjusted to a pH in the range of about 10.7 to about 14.0.

14. A process according to claim 1 wherein the waste or groundwater is maintained at said adjusted pH before said treatment step for a time sufficient to assist in hydrolysis of said compound.

* * * * *